US010642985B2

(12) United States Patent
Li (10) Patent No.: US 10,642,985 B2
(45) Date of Patent: May 5, 2020

(54) METHOD AND DEVICE FOR VULNERABILITY SCANNING (71) Applicants: NSFOCUS INFORMATION TECHNOLOGY CO., LTD., Beijing (CN); NSFOCUS TECHNOLOGIES INC., Beijing (CN)

(72) Inventor: Ying Li, Beijing (CN)

(73) Assignees: NSFOCUS INFORMATION TECHNOLOGY CO., LTD., Beijing (CN); NSFOCUS TECHNOLOGIES INC., Beijing (CN)

( * ) Notice: Subject to any disclaimer, the term of this patent is extended or adjusted under 35 U.S.C. 154(b) by 239 days.

(21) Appl. No.: 15/614,568

(22) Filed: Jun. 5, 2017

(65) Prior Publication Data
US 2017/0270304 A1  Sep. 21, 2017

Related U.S. Application Data (63) Continuation of application No. PCT/CN2015/091030, filed on Sep. 29, 2015.

(30) Foreign Application Priority Data

Dec. 19, 2014 (CN) .......................... 2014 1 0802136

(51) Int. Cl.
*G06F 11/00* (2006.01)
*G06F 12/14* (2006.01)
(Continued)

(52) U.S. Cl.
CPC .......... *G06F 21/577* (2013.01); *G06F 21/554* (2013.01); *H04L 63/0254* (2013.01);
(Continued)

(58) Field of Classification Search
CPC ..................................................... G06F 21/577
(Continued)

(56) References Cited

U.S. PATENT DOCUMENTS 9,203,851 B1 * 12/2015 Wang .................. H04L 63/1408
2010/0071024 A1   3/2010 Eyada ............................. 726/1
(Continued)

FOREIGN PATENT DOCUMENTS

CN     101064736 A   10/2007
CN     101340434 A    1/2009
(Continued)

OTHER PUBLICATIONS

International Search Report of corresponding International PCT Application No. PCT/CN2015/091030, dated Jan. 4, 2016.
(Continued)

*Primary Examiner* — Wasika Nipa
*Assistant Examiner* — Samuel Ambaye
(74) *Attorney, Agent, or Firm* — J.C. Patents (57) ABSTRACT

The disclosed embodiment provides a method and device for vulnerability scanning, the method comprising: a reverse scanning agent module acquires a client message; the reverse scanning agent module transmits the client message to a vulnerability scanner, enabling the vulnerability scanner to identify a vulnerability of the client according to the client message; or the reverse scanning agent module identifies the vulnerability of the client according to the client message and transmits the vulnerability to the vulnerability scanner; the reverse scanning agent module receives a control instruction from the vulnerability scanner, changes operation manner and/or mode according to the control instruction, and updates a vulnerability rule. The reverse scanning agent module in the disclosure acquires and analyzes the client message to identify the vulnerability of the client,
(Continued)

which supplements server security issue remote detection with client security issue analysis, thereby realizing security detection for the entire network.

14 Claims, 6 Drawing Sheets (51) Int. Cl.
　　*G06F 12/16*　　(2006.01)
　　*G08B 23/00*　　(2006.01)
　　*G06F 21/57*　　(2013.01)
　　*H04L 29/06*　　(2006.01)
　　*G06F 21/55*　　(2013.01)
(52) U.S. Cl.
　　CPC .......... *H04L 63/0263* (2013.01); *H04L 63/10* (2013.01); *H04L 63/1416* (2013.01); *H04L 63/1433* (2013.01); *H04L 63/20* (2013.01)
(58) Field of Classification Search
　　USPC .................................................... 726/25, 24
　　See application file for complete search history.

(56) References Cited

U.S. PATENT DOCUMENTS

2010/0175134 A1\* 7/2010 Ali-Ahmad ......... H04L 63/1408
　　　　　　　　　　　　　　　　　　　　　726/24
2014/0082739 A1\* 3/2014 Chess ................... G06F 21/577
　　　　　　　　　　　　　　　　　　　　　726/25
2014/0137180 A1　 5/2014 Lukacs et al. .................... 726/1

FOREIGN PATENT DOCUMENTS

| | | |
|---|---|---|
| CN | 101588247 A | 11/2009 |
| CN | 102082659 A | 6/2011 |
| CN | 102664876 A | 9/2012 |
| CN | 102945340 A | 2/2013 |
| CN | 103679026 A | 3/2014 |
| CN | 103890771 A | 6/2014 |
| CN | 103929323 A | 7/2014 |
| CN | 104506522 A | 4/2015 |
| JP | 2003-271469 A | 9/2003 |
| JP | 2005-503053 A | 1/2005 |
| JP | 2005-341167 A | 12/2005 |
| JP | 2006-526221 A | 11/2006 |
| JP | 2007-272396 A | 10/2007 |
| JP | 2007-325293 A | 12/2007 |
| JP | 2009-514093 A | 4/2009 |

OTHER PUBLICATIONS

Chinese First Examination Report of corresponding Chinese patent Application No. 201410802136.4, dated Apr. 21, 2017.
The Japanese Examination Report of corresponding Japan patent application No. 2017-532916, dated May 23, 2018.

\* cited by examiner

FIG. 9 ial Appli-
METHOD AND DEVICE FOR VULNERABILITY SCANNING

CROSS-REFERENCE TO RELATED APPLICATIONS

This application is a continuation of International Application No. PCT/CN2015/091030, filed on Sep. 29, 2015, which claims priority to Chinese Patent Application No. 201410802136.4, filed on Dec. 19, 2014. The disclosures of the aforementioned applications are hereby incorporated by reference in their entireties.

TECHNICAL FIELD

Embodiments of the present disclosure relate to the field of network security and, particularly, to a method and a device for vulnerability scanning.

BACKGROUND

With the development of computer network technology, the network security technology also continuously evolves. If there are major vulnerabilities in the server, hackers can steal important information from the server or client via those vulnerabilities, resulting in serious consequences. Thus, the significance of network security has become increasingly prominent.

The prior art mainly protects the network security by remotely detecting vulnerability on a server using a vulnerability scanner. Specifically, the vulnerability scanner acts as a client to send a connection request message to the server. The server replies to the connection request message, and sends a reply message back to the vulnerability scanner. Then, the vulnerability scanner will make analysis and determine whether there is any vulnerability in the server according to the reply message.

Since a complete network environment includes not only the server, but also the clients connected to the server, the security of the entire network environment cannot be verified by the prior art which performs remote security check for the server only.

SUMMARY

Embodiments of the present disclosure provide a method and a device for scanning the vulnerability, so as to detect the security of an entire network environment.

An aspect of the embodiments of the present disclosure provides a vulnerability scanning method, including:

acquiring, by a reverse scanning agent module, a client message;

transmitting, by the reverse scanning agent module, a client message to a vulnerability scanner, so that the vulnerability scanner identifies a vulnerability of the client according to the client message, or the reverse scanning agent module identifies the vulnerability of the client according to the client message and transmits the vulnerability of the client to the vulnerability scanner; and receiving, by the reverse scanning agent module, a control instruction from the vulnerability scanner; changing, by the reverse scanning agent module, a manner and/or a mode of operation according to the control instruction; and updating, by the reverse scanning agent module, a vulnerability rule.

Another aspect of the embodiments of the present disclosure provides a reverse scanning agent module, including:

a message acquiring module, configured to acquire a client message;

a transmitting module, configured to transmit the client message to a vulnerability scanner, so that the vulnerability scanner identifies a vulnerability of the client according to the client message, or to a message identifying and transmitting module which is configured to identify a vulnerability of the client according to the client message, and transmit the vulnerability of the client to the vulnerability scanner; and a receiving and controlling module, configured to receive a control instruction from the vulnerability scanner, and change a manner and/or a mode of operation according to the control instruction, so as to update a vulnerability rule.

Yet another aspect of the embodiments of the present disclosure provides a vulnerability scanner, including:

a receiving module, configured to receive a client message transmitted from a reverse scanning agent module; or receive a vulnerability of the client transmitted from the reverse scanning agent module;

a message identifying module, configured to identify a vulnerability of the client according to the client message;

an instruction transmitting module, configured to transmit a control instruction to the reverse scanning agent module, so that the reverse scanning agent module changes the manner and/or mode of operation according to the control instruction, and updates a vulnerability rule.

Yet another aspect of the embodiments of the present disclosure provides a vulnerability scanning system, including the above described reverse scanning agent module and vulnerability scanner.

The method and device for vulnerability scanning provided in the embodiments of the present disclosure acquire the client message through the reverse scanning agent module, and then analyze the client message to identify the vulnerabilities in the client, which supplements the basis of server security issue remote detection with client security issue analysis, thereby realizing security detection for the entire network environment.

DESCRIPTION OF EMBODIMENTS

Figure 1:
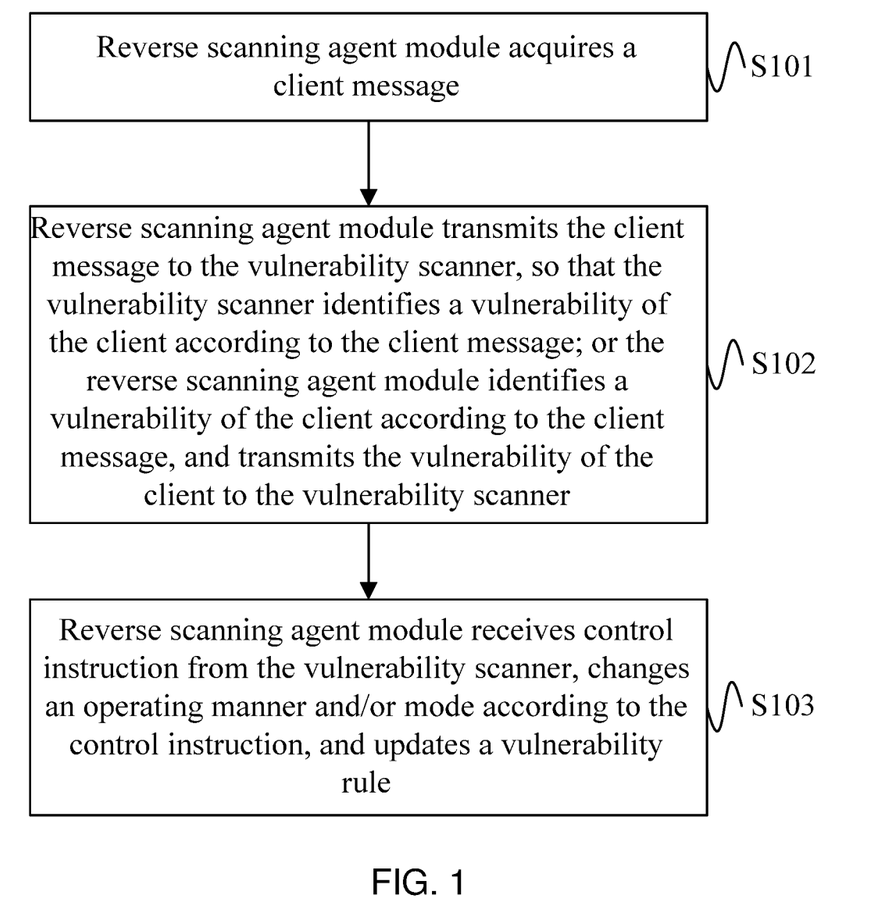
FIG. 1 is a flow chart illustrating a vulnerability scanning method provided in an embodiment of the present disclosure.
Figure 2:
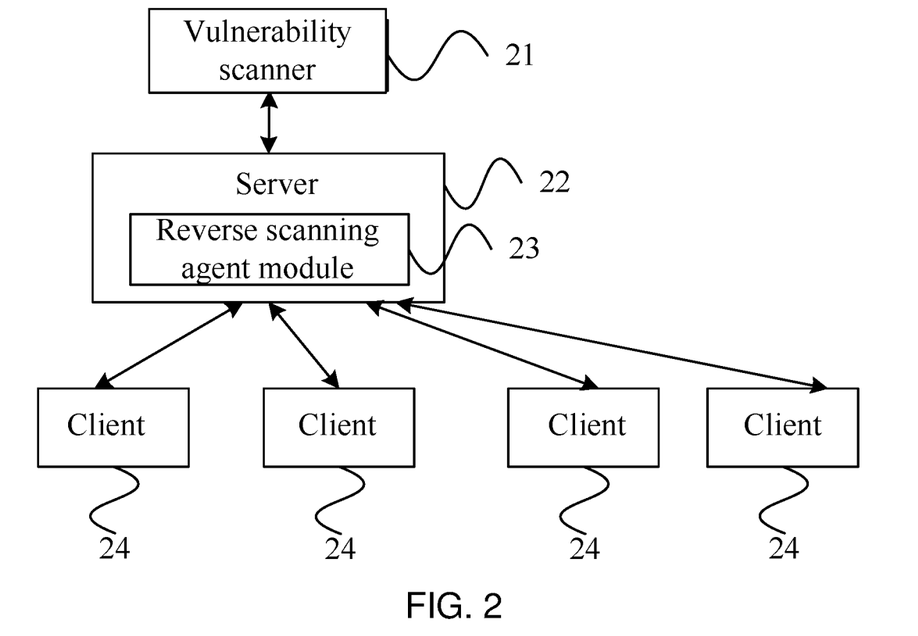
FIG. 2 is a network topology diagram provided in an embodiment of the present disclosure.

FIG. 1 is a flow chart illustrating a vulnerability scanning method provided in an embodiment of the present disclosure, and FIG. 2 is a network topology diagram provided in an embodiment of the present disclosure. Particular steps of the vulnerability scanning method provided in the embodiment of the disclosure are as the following.

Step S101: a reverse scanning agent module acquires a client message.

The reverse scanning agent module is installed on a server, where the reverse scanning agent module acquires a client message in that: the reverse scanning agent module acquires a service request message and a reply message transmitted from the client during an interaction between the client and the server; or the reverse scanning agent module transmits a constructive test message to the client for acquiring a respond message from the client in response to the constructed test message.

As shown in FIG. 2, with consent from the server administrator, the reverse scanning agent module 23 is installed on the server 22. An operating mode of the reverse scanning agent module 23 includes a lossless mode and a reverse scanning mode. The lossless mode means the reverse scanning agent module 23 acquires service request message and reply message transmitted from the client 24 during an interaction between the server 22 and the client 24. The reverse scanning mode means that the reverse scanning agent module 23 constructs a test message, transmits the constructed test message to the client 24, and acquires a respond message from the client 24 in response to the constructed test message.

Step S102: the reverse scanning agent module transmits the client message to the vulnerability scanner, so that the vulnerability scanner identifies a vulnerability of the client according to the client message; or the reverse scanning agent module identifies a vulnerability of the client according to the client message, and transmits the vulnerability of the client to the vulnerability scanner.

The reverse scanning agent module 23 on the server 22 further includes two operating modes: an agent mode and a resident mode. The agent mode means that the reverse scanning agent module 23 directly transmits the acquired messages from the client 24 to the vulnerability scanner 21 for analyzing. The resident mode means that the reverse scanning agent module 23 analyzes the acquired message transmitted from the client 24 in order to obtain an intermediate processing result, and then transmits the intermediate processing result to the vulnerability scanner 21.

Step S103: the reverse scanning agent module receives control instruction from the vulnerability scanner, changes an operating manner and/or mode according to the control instruction, and updates a vulnerability rule.

The vulnerability scanner 21 realizes control over the reverse scanning agent module 23 by transmitting the control instruction thereto. In particular, the reverse scanning agent module 23 changes its operating manner and/or mode according to the control instruction and updates the vulnerability rule.

The embodiment of the disclosure acquires the client message via the reverse scanning agent module, and analyzes the client message to identify the vulnerability of the client, which supplements the basis of server security issue remote detection with client security issue analysis, thereby realizing security detection for the entire network environment.

On the basis of the above described embodiment, the vulnerability scanner identifies the vulnerability of the client according to the client message in that: identifying the vulnerability of the client according to a characteristic field of the service request message, the reply message and/or the respond message; or identifying the vulnerability of the client by matching the service request message, the reply message and/or the respond message with a preset interaction message, a preset message sequence or a vulnerability characteristics rule.

The embodiment of the present disclosure can, through the cooperation between any operation manners and any operation modes of the reverse scanning agent module 23, acquire the message transmitted from the client 24, and analyze and process the message. The execution subject, which identifies the vulnerability of the client according to the message transmitted from the client, may be the server 22 or the vulnerability scanner 21. The particular identification method includes: 1) identifying the vulnerability of the client according to the characteristic field of the service request message, the reply message and/or the respond message; 2) identifying the vulnerability of the client by matching the service request message, the reply message and/or the respond message with a preset interaction message, a preset message sequence or a vulnerability characteristics rule.

Method 1): If the User-Agent field of the service request message transmitted from the client 24 is:

Mozilla/5.0 (X11; Ubuntu; Linux x86_64; rv:24.0) Gecko/20100101 Firefox/24.0; or Mozilla/5.0 (Windows NT 6.0; WOW64; rv:24.0) Gecko/20100101 Firefox/24.0; or Opera/9.80 (Windows NT 6.1; U; es-ES) Presto/2.9.181 Version/12.00;

By analyzing the User-Agent field, information, such as the version and model of the browser as well as the type of the operating system used on the client 24, can be obtained. By matching relevant information obtained from the analysis of the User-Agent field with a vulnerability database commonly known in the art, it can be determined whether any vulnerability is in the client 24.

In an existing vulnerability database, the data retrieval is performed with a priority based on the level of association between the vulnerability and different information, as well as the number of vulnerabilities. For example, starting from the version of the browser, it can be determined that the following vulnerabilities might be found in the client:

Mozilla Firefox/Thunderbird/SeaMonkey Browser Engine Memory Security Vulnerabilities (CVE-2013-5609);

Mozilla Firefox/Thunderbird/SeaMonkey Browser Engine Memory Security Vulnerabilities (CVE-2013-5610);

And then, proceeding to the OS version, the following vulnerabilities might be found in the client:

Windows kernel information leakage vulnerabilities (MS13-048), Microsoft Windows LPC and LPC port denial of service vulnerabilities.

In addition, the embodiment of the disclosure is not limited to the detection of the User-Agent field, and may detect other fields of the message transmitted from the client 24.

Method 2): For a known vulnerability type, a typical message format and interaction sequence for the vulnerability's particular request can be pre-stored. For example, for a multiple malformed HTML parsing denial of service vulnerability in an Opera Web browsers, a typical message or sequence, in particular, a malformed request message, of the vulnerability can be pre-stored by the reverse scanning agent module, so as to match the acquired client message with the malformed request message. Or, the reverse scanning agent module can, operating in the reverse scanning mode, transmit a constructed test message to the client, so as to check whether any malformed request message is returned from the client. In order to ensure accuracy rate, the existence of such vulnerabilities in the client browser can be determined after several matching hits. The typical message or sequence characteristics can be specifically defined against different vulnerabilities.

Embodiments of the disclosure provide two approaches to identify vulnerabilities in a client.

Figure 3:
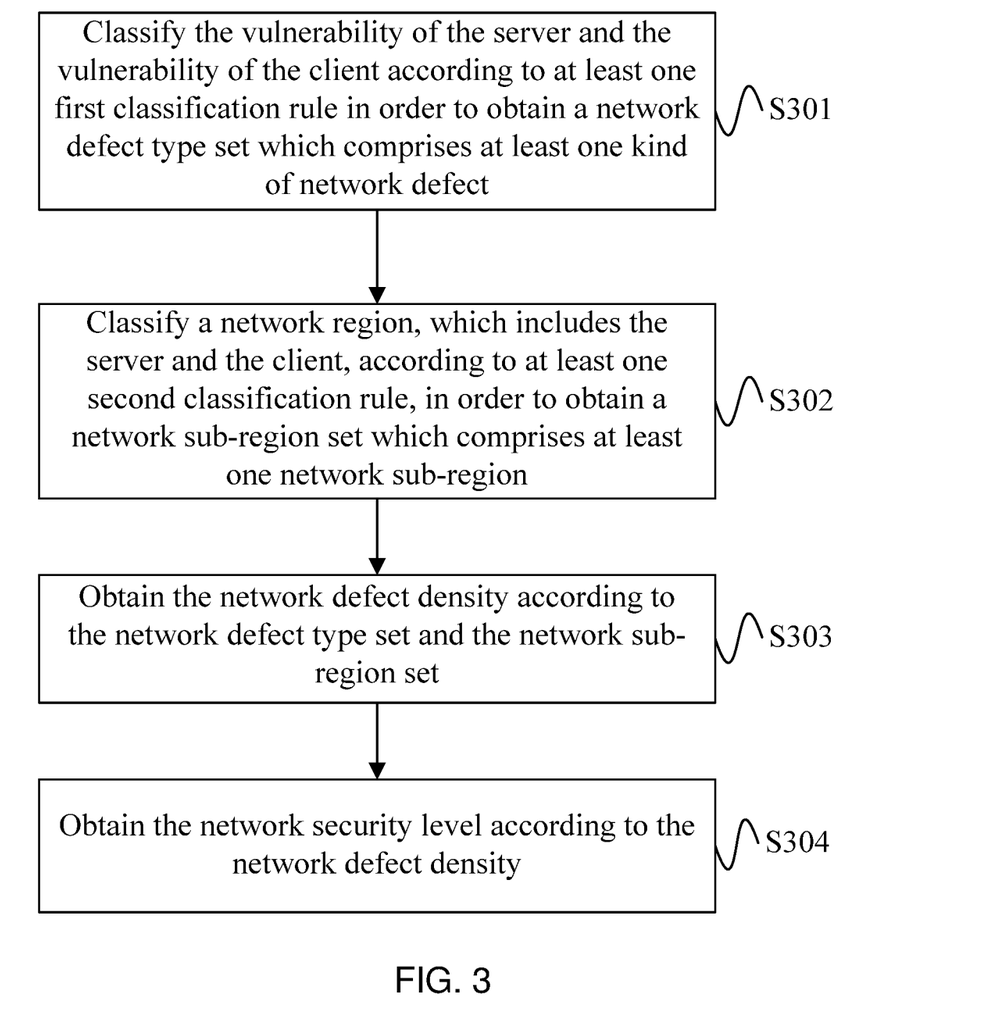
FIG. 3 is a flow chart illustrating a method for acquiring network defect information provided in an embodiment of the present disclosure.

FIG. 3 is a flow chart illustrating a method for acquiring network defect information provided in an embodiment of the present disclosure. On the basis of the above described embodiment, the method further includes: obtaining, by the reverse scanning agent module or the vulnerability scanner, the vulnerability of the server; and obtaining, by the reverse scanning agent module or the vulnerability scanner, network defect information according to the vulnerability of the server and the vulnerability of the client.

The network defect information includes a network defect density and a network security level. The obtaining network defect information according to the vulnerability of the server and the vulnerability of the client includes the steps of:

Step S301: classifying the vulnerability of the server and the vulnerability of the client according to at least one first classification rule in order to obtain a network defect type set which includes at least one kind of network defect. The first classification rule may indicate a classification based on an attribute inherent to the vulnerability. As an example only, the first classification rule may be WASC2.0, whereby the vulnerabilities may be classified into network defects such as SQL injection, denial of service (DoS), cross-site scripting (XSS), etc. As another example, the first classification rule may be OWSAP-2013.

The classifying the vulnerability of the server and the vulnerability of the client according to at least one first classification rule in order to obtain a network defect type set includes: classifying, according to an m-th first classification rule in the at least one first classification rule, the vulnerability of the server and the vulnerability of the client into a first set $p_n^m = \{\delta_0^m, \delta_1^m, \delta_2^m, \ldots, \delta_i^m, \ldots \delta_{n-1}^m\}$, where $m \geq 1$, $n \geq 1$, the first set includes n types of network defects, $\delta_i^m$ represents an (i+1)-th type of network defect obtained by classifying the vulnerabilities according to the m-th first classification rule, and for i, $j \in [0, n-1]$ and $i \neq j$, $\delta_i^m, \delta_j^m \neq \emptyset$, $\delta_i^m \cap \delta_j^{m=0}$ and $\delta_0^m \cup \delta_1^m \cup \delta_2^m \cup \ldots \cup \delta_{n-1}^m = p_n^m$ are satisfied; and determining, in the first classification rule, a first target classification rule which classifies the vulnerabilities into N or less than N types of network defects, and classifying the vulnerabilities according to the first target classification rule in order to obtain a first set which constitutes the network defect type set $\delta_p = \cup_{n=1}^N \cup_{r=F(n)} \cup_{i=0}^{n-1} \delta_i^r$, where F(n) is a mapping function of n, and represents the first target classification rule for classifying the vulnerabilities into $n \leq N$ types of network defects, $\cup_{r=F(n)} \cup_{i=0}^{n-1} \delta_i^r$ represents the set of $n \leq N$ types of network defects obtained by classifying the vulnerabilities.

The vulnerabilities mentioned in this step refer to a collection of vulnerabilities in both the server 22 and the client 24. The vulnerabilities are classified according to a plurality of first classification rules. Assuming that the vulnerabilities are classified to a first set $p_n^m = \{\delta_0^m, \delta_1^m, \delta_2^m, \ldots, \delta_i^m, \ldots \delta_{n-1}^m\}$, where $m \geq 1$, $n \geq 1$, the first set includes n types of network defects, $\delta_i^m$ represents an (i+1)-th type of network defect obtained by classifying the vulnerabilities according to the m-th first classification rule, and for i, $j \in [0, n-1]$ and $i \neq j$, $\delta_i^m, \delta_j^m \neq \emptyset$, $\delta_i^m \cap \delta_j^m = \emptyset$ and $\delta_0^m \cup \delta_1^m \cup \delta_2^m \cup \ldots \cup \delta_{n-1}^m = p_n^m$ are satisfied. However, the n types of network defects are not always obtained each time a first classification rule is applied to classify the vulnerabilities. That is, the number n is variable in that the number of network defect types obtained by classifying the vulnerabilities according to first classification rules other than the m-th first classification rule may be larger than, less than, or equal to the n. Using the N as a threshold for the number of the network defect types, a first target classification rule, which can be used to classify the vulnerabilities into less than or equal to N types of network defects, is selected from the first classification rules, and is accordingly used to classify the vulnerabilities to obtain a first set that includes a network defect type set $\delta_p \cup_{n=1}^N \cup_{r=F(n)} \cup_{i=0}^{n-1} \delta_i^r$, where F(n) is a mapping function of n, and represents the first target classification rule for classifying the vulnerabilities into $n \leq N$ types of network defects, and $\cup_{r=F(n)} \cup_{i=0}^{n-1} \delta_i^r$ represents the set of $n \leq N$ types of network defects obtained by classifying the vulnerabilities.

Step S302: classifying a network region, which includes the server and the client, according to at least one second classification rule, in order to obtain a network sub-region set which includes at least one network sub-region. The second classification rule may indicate a classification based on a attribute associated with vulnerability distribution with respect to, by way of example only, browser types, locations, etc.

The classifying a network region, which includes the server and the client, according to at least one second classification rule in order to obtain a network sub-region set includes: classifying, according to a t-th second classification rule in the at least one second classification rule, the network region into a second set $\rho^t = \{\rho_0^t, \rho_1^t, \rho_2^t, \ldots, \rho_s^t, \ldots, \rho_{S-1}^t\}$, where $t \geq 1$, $S \geq 1$, $\rho_s^t$ represents an (S+1)-th network sub-region obtained by classifying the network region according to the t-th second classification rule, and for i, $j \in [0, S-1]$ and $i \neq j$, $\rho_i^t, \rho_j^t \neq \emptyset$, $\rho_i^t \cap \rho_j^t = \emptyset$ and $\rho_0^t \cup \rho_1^t \cup \rho_2^t \cup \ldots \cup \rho_{S-1}^t = \rho^t$ are satisfied; and classifying the network region according to T of the second classification rules separately, in order to obtain a second set which constitutes a network sub-region set $\rho = \cup_{t=1}^T \cup_{S=0}^{G(t)} \rho_S^t$, where G(t) represents the number of network sub-regions obtained by classifying the network region according to the t-th second classification rule.

The network region in this step refers to a network region including the server and the client. The network regions are classified into a second set $\rho^t = \{\rho_0^t, \rho_1^t, \rho_2^t, \ldots, \rho_s^t, \ldots \rho_{S-1}^t\}$, where $t \geq 1$ and $S \geq 1$, according to the t-th second classification rule in the second classification rule. The $\rho_s^t$ represents an (s+1)-th network sub-region obtained by classifying the network regions according to the t-th second classification rule, and for i, $j \in [0, S-1]$ and $i \neq j$, $\rho_i^t, \rho_j^t \neq \emptyset$, $\rho_i^t \cap \rho_j^t = \emptyset$ and $\rho_0^t \cup \rho_1^t \cup \rho_2^t \cup \ldots \cup \rho_{S-1}^t = \rho^t$ are satisfied. Assuming that the t-th second classification rule refers to the browser type of the client, then $\rho_0^t$ represents a network sub-region in which the browser type of the client is IE browser, $\rho_1^t$ represents a network sub-region in which the browser type of the client is Fire Fox browser, $\rho_2^t$ represents a network sub-region in which the browser type of the client is Opera browser . . . , and $\rho_{S-1}^t$ represents a network sub-region in which the browser type of the client is SOGOU browser. Different second sets are obtained by classifying the network regions based on different second classification rules. The network sub-region set $\rho=U_{t=1}^{T}U_{S=0}^{G(t)}\rho_S^t$ includes the second sets obtained by classifying the network regions according to each of the second classification rules in the embodiment of the disclosure, where G(t) represents the number of the network sub-regions obtained after classifying the network regions according to the t-th second classification rule.

Step S303: obtaining the network defect density according to the network defect type set and the network sub-region set.

The network defect density includes a network defect density in the network sub-region and a device defect density in the network sub-region.

The network defect density in the network sub-region represents the density of a certain type of network defect in a particular network sub-region, and the device defect density in the network sub-region represents the number of clients having a certain network defect in a particular network sub-region. That is, the network defect density in the network sub-region and the device defect density in the network sub-region are two aspects for assessing the network defect density.

The obtaining the network defect density according to the network defect type set and the network sub-region set includes: obtaining the network defect density $\tau_{t,s}^{m,i}=C(Q_{\rho_S^t}(\delta_i^m))$ in the network sub-region according to the network defect type set $\delta_p=U_{n=1}^{N}U_{r=F(n)}U_{i=0}^{n-1}\delta_i^r$ and the network sub-region set $\rho=U_{t=1}^{T}U_{S=0}^{G(t)}\rho_S^t$, where $\delta_i^m \in \delta_p = U_{n=1}^{N}U_{r=F(n)}U_{i=0}^{n-1}\delta_i^r$, $\rho_S^t \in \rho = U_{t=1}^{T}U_{S=0}^{G(t)}\rho_S^t$, $Q_{\rho_S^t}(\delta_i^m)$ is configured for selecting $\delta_i^m$ within the scope of $\rho_S^t$, and $C(Q_{\rho_S^t}(\delta_i^m))$ is configured for calculating the number of $Q_{\rho_S^t}(\delta_i^m)$; and obtaining the device defect density $\varphi_{m,i}^{t,s}=C(Q_{o_i^m}(\rho_S^t))$ in the network sub-region according to the network defect type set $\delta_P=U_{n=1}^{N}U_{r=F(n)}U_{i=0}^{n-1}\delta_i^r$ and the network sub-region set $\rho=U_{t=1}^{T}U_{s=0}^{G(t)}\rho_S^t$, where $\delta_i^m \in \delta_p=U_{n=1}^{N}U_{r=F(n)}U_{i=0}^{n-1}\delta_i^r$, $\rho_S^t \in \rho=U_{t=1}^{T}U_{s=0}^{G(t)}\rho_S^t$, $Q_{o_i^m}(\rho_S^t)$ is configured for selecting $\rho_s^t$ within the scope of $\delta_i^m$, and $C(Q_{o_i^m}(\rho_S^t))$ is configured for calculating the number of $Q_{o_i^m}(\rho_S^t)$.

Step S304: obtaining the network security level according to the network defect density.

The network security level includes a first network security level and a second network security level.

A network sub-region with higher network defect density has lower network security level, and a network sub-region with lower network defect density has higher network security level. Since two approaches are included in the step S303 for assessing the network defect density, there are, accordingly, two corresponding network security levels: a first network security level and a second network security level. In particular, the first network security level corresponds to the network defect density in the network sub-region, and the second network security level corresponds to the device defect density in the network sub-region, where the first and second network security levels are also quantities for assessing, from two aspects, the network security level.

The obtaining the network security level according to the network defect density includes:

obtaining the first network security level $\gamma_{t,s}=U_{n=1}^{N}U_{m=F(n)}U_{i=0}^{n-1}\gamma_{t,s}^{m,i}$ according to the network defect density $\tau_{t,s}^{m,i}=C(Q_{\rho_S^t}(\delta_i^m))$ in the network sub-region, where $\gamma_{t,s}^{m,i}=Y_1(\tau_{t,s}^{m,i})$ and $Y_1$ is a monotonically decreasing function of $\tau_{t,s}^{m,i}$; and obtaining the second network security level $\gamma^{t,s}=U_{n=1}^{N}U_{m=F(n)}U_{i=0}^{n-1}\gamma_{m,i}^{t,s}$ according to the device defect density $\varphi_{m,i}^{t,s}=C(Q_{o_i^m}(\rho_S^t))$ in the network sub-region, where $\gamma_{m,i}^{t,s}=Y_2(\varphi_{mi}^{t,s})$, and $Y_2$ is a monotonically decreasing function of $\varphi_{m,i}^{t,s}$.

The embodiment of the disclosure classifies the vulnerabilities in the server and the client according to different first classification rules in order to obtain the network defect type set; classifies the network region, which includes the server and the client, according to different second classification rules in order to obtain the network sub-region set; obtains the network defect density according to the network defect type set and the network sub-region set; and obtains network security levels according to the network defect density, thereby realizing a quantitative description of the network security level.

On the basis of above described embodiments, the $\gamma_{t,s}^{m,i}=Y_1(\tau_{t,s}^{m,i})$ is $\gamma_{t,s}^{m,i}=\alpha_1+\beta_1/\tau_{t,s}^{m,i}$; the $\gamma_{m,i}^{t,s}=Y_2(\varphi_{m,i}^{t,s})$ is $\gamma_{m,i}^{t,s}=\alpha_2+\beta_2/\varphi_{m,i}^{t,s}$, where $\alpha_1$, $\beta_1$, $\alpha_2$, $\beta_2$ are constants.

The higher the network defect density is, the lower the network security level of the network sub-region is; and the lower the network defect density is, the higher the network security level of the network sub-region is. That is, the network security level is inversely proportional to the network defect density. In the above described embodiments, the association between the network security level and the network defect density is expressed by the monotonic decreasing functions $Y_1$ and $Y_2$. The embodiment of the present disclosure preferably uses $\gamma_{t,s}^{m,i}=\alpha_1+\beta_1/\tau_{t,s}^{m,i}$ and $\gamma_{m,i}^{t,s}=\alpha_2+\beta_2/\varphi_{m,i}^{t,s}$ to express the monotonic decreasing functions $Y_1$ and $Y_2$, where $\alpha_1$, $\beta_1$, $\alpha_2$, $\beta_2$ are constants.

The network defect information further includes: a network defect density distribution and a network security level distribution. The network defect density distribution includes a distribution function of the network defect density in the network sub-region, and a distribution function of the device defect density in the network sub-region. The network security level distribution includes a distribution of the first network security level and a distribution of the second network security level, where the distribution function of the network defect density in the network sub-region is $\tau_t^{m,i}=U_{s=0}^{G(t)}\tau_{t,s}^{m,i}$, the distribution function of the device defect density in the network sub-region is $\varphi_{m,i}^t=U_{s=0}^{G(t)}\varphi_{m,i}^{t,s}$, the distribution of the first network security level is $\gamma_t=U_{s=0}^{G(t)}U_{n=1}^{N}U_{m=F(n)}U_{i=0}^{n-1}\gamma_{t,s}^{m,i}$, and the distribution of the second network security level is $\gamma^t=U_{s=0}^{G(t)}U_{n=1}^{N}U_{m=F(n)}U_{i=0}^{n-1}\gamma_{m,i}^{t,s}$.

The aforementioned embodiments demonstrate the security of the network by using the first network security level and the second network security level, and the embodiment of the present disclosure demonstrates the security of the network by using the distribution of the first network security level and the distribution of the second network security level.

The embodiment of the disclosure specifically defines the association between the network security level and the network defect density, while additionally including the network security level distribution as a means to determine the security of the network.

Figure 4:
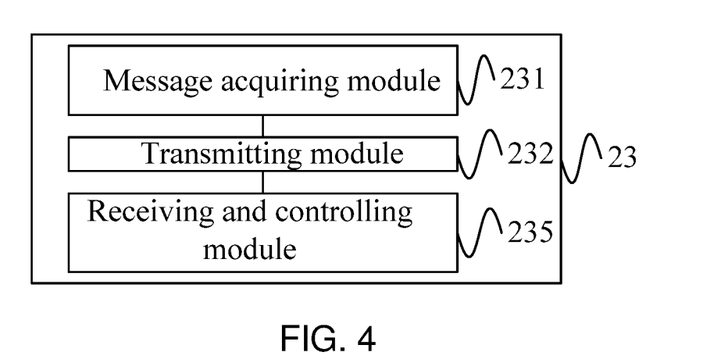
FIG. 4 is a structural diagram illustrating a reverse scanning agent module provided in an embodiment of the present disclosure.
Figure 5:
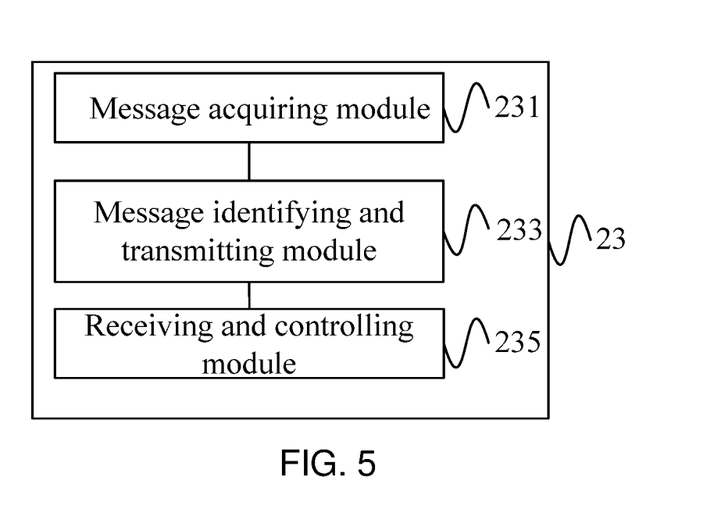
FIG. 5 is a structural diagram illustrating a reverse scanning agent module provided in another embodiment of the present disclosure.
Figure 6:
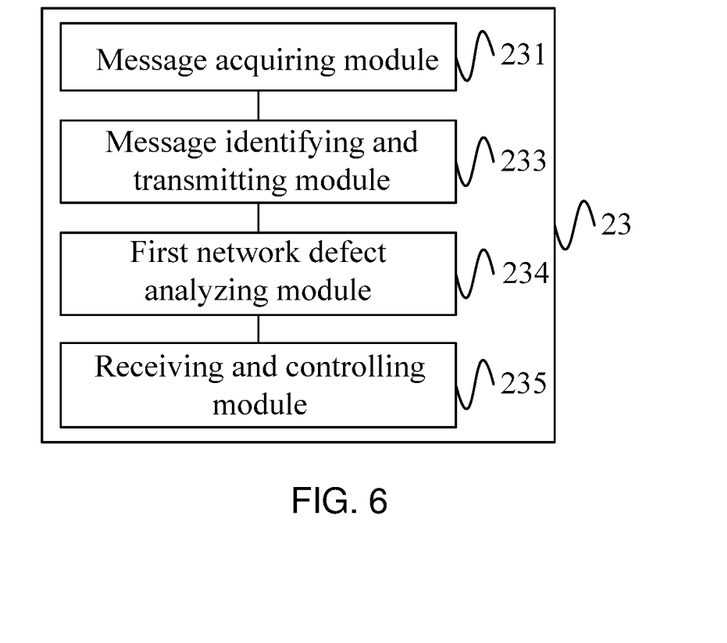
FIG. 6 is a structural diagram illustrating a reverse scanning agent module provided in yet another embodiment of the present disclosure.

FIG. 4 is a structural diagram illustrating a reverse scanning agent module provided in an embodiment of the present disclosure; FIG. 5 is a structural diagram illustrating a reverse scanning agent module provided in another embodiment of the present disclosure; and FIG. 6 is a structural diagram illustrating a reverse scanning agent module provided in yet another embodiment of the present disclosure. The embodiment of the disclosure provides a reverse scanning agent module capable of performing the processing flows provided in the vulnerability scanning method embodiments as shown in FIGS. 4 and 5. The reverse scanning agent module 23 includes a message acquiring module 231, a transmitting module 232 or a message identifying and transmitting module 233, and a receiving and controlling module 235, where the message acquiring module 231 is configured to acquire a client message; the transmitting module 232 is configured to transmit the client message to the vulnerability scanner, so that the vulnerability scanner identifies a vulnerability of the client according to the client message; the message identifying and transmitting module 233 is configured to identify a vulnerability of the client according to the client message and transmit the vulnerability of the client to the vulnerability scanner; and the receiving and controlling module 235 is configured to receive a control instruction from the vulnerability scanner, and change a manner and/or a mode of operation according to the control instruction, so as to update a vulnerability rule.

The reverse scanning agent module 23 is installed on a server. The message acquiring module 231 is configured to acquire a service request message and a reply message transmitted from the client during an interaction between the client and the server; or the transmitting module 232 is further configured to transmit a constructed test message to the client; and the message acquiring module 231 is configured to acquire a respond message from the client in response to the constructed test message.

The message identifying and transmitting module 233 is configured to identify the vulnerability of the client according to the characteristic field of the service request message, the reply message and/or the respond message; or identify the vulnerability of the client by matching the service request message, the reply message and/or the respond message with a preset interaction message, a preset message sequence or a vulnerability characteristics rule.

The message acquiring module 231 is further configured to acquire the vulnerability of the server. As shown in FIG. 6, the reverse scanning agent module 23 further includes a first network defect analyzing module 234, configured to acquire the network defect information according to the vulnerability of the server and the vulnerability of the client.

The embodiment of the disclosure acquires the client message via the reverse scanning agent module, and analyzes the client message to identify the vulnerability of the client, which supplements the basis of server security issue remote detection with client security issue analysis, thereby realizing security detection for the entire network environment.

Figure 7:
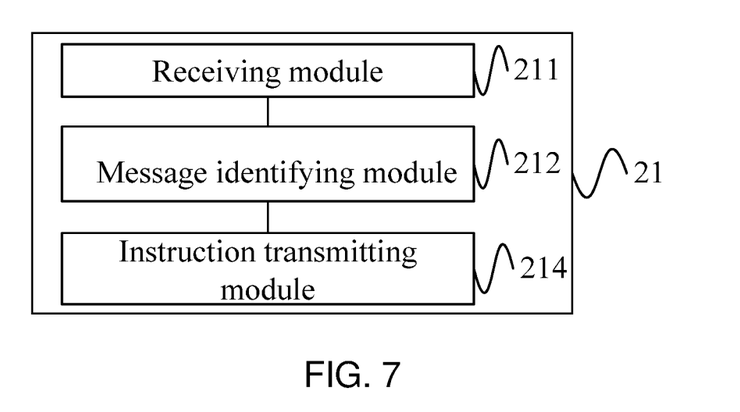
FIG. 7 is a structural diagram illustrating a vulnerability scanner provided in an embodiment of the present disclosure.
Figure 8:
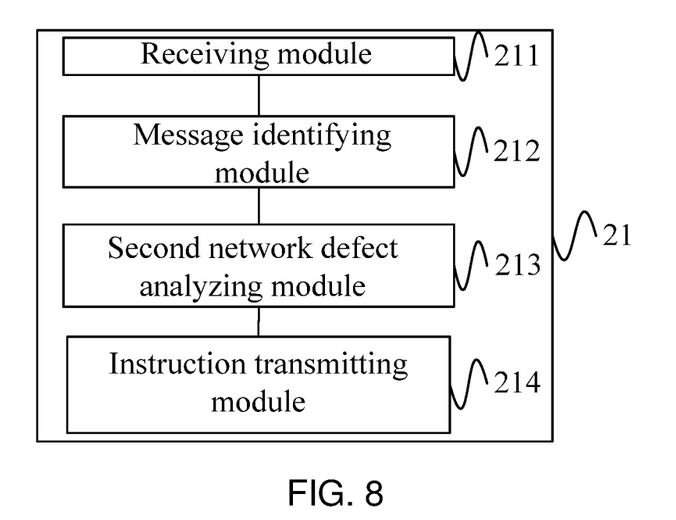
FIG. 8 is a structural diagram illustrating a vulnerability scanner provided in another embodiment of the present disclosure.

FIG. 7 is a structural diagram illustrating a vulnerability scanner provided in an embodiment of the present disclosure, and FIG. 8 is a structural diagram illustrating a vulnerability scanner provided in another embodiment of the present disclosure. The vulnerability scanner provided in the embodiment of the disclosure can perform the processing flow provided in the vulnerability scanning method embodiment. As shown in FIG. 7, the vulnerability scanner 21 includes a receiving module 211, a message identifying module 212 and an instruction transmitting module 214, where the receiving module 211 is configured to receive a client message transmitted from a reverse scanning agent module, or receive a vulnerability of a client transmitted from the reverse scanning agent module; the message identifying module 212 is configured to identify the vulnerability of the client according to the client message; the instruction transmitting module 214 is configured to transmit a control instruction to the reverse scanning agent module, so that the reverse scanning agent module changes a manner and/or a mode of operation according to the control instruction and update a vulnerability rule.

The message identifying module 212 is configured to identify the vulnerability of the client according to the characteristic field of the service request message, the reply message and/or the respond message; or identify the vulnerability of the client by matching the service request message, the reply message and/or the respond message with a preset interaction message, a preset message sequence or a vulnerability characteristics rules.

The receiving module 211 is further configured to acquire a vulnerability of the server. As shown in FIG. 8, the vulnerability scanner 21 further includes a second network defect analyzing module 213, configured to acquire network defect information according to the vulnerability of the server and the vulnerability of the client.

The embodiment of the disclosure acquires the client message via the reverse scanning agent module and then analyzes the client message to identify the vulnerability of the client, which supplements the basis of server security issue remote detection with client security issue analysis, thereby realizing security detection for the entire network environment.

Figure 9:
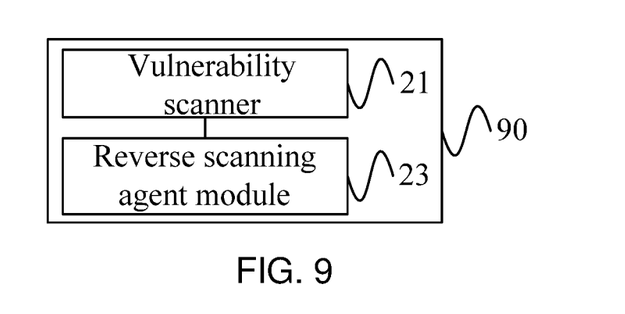
FIG. 9 is a structural diagram illustrating a vulnerability scanning system provided in an embodiment of the present disclosure.

FIG. 9 is a structural diagram illustrating a vulnerability scanning system provided in an embodiment of the present disclosure. The vulnerability scanning system provided in the embodiment of the disclosure can perform the processing flow provided in the vulnerability scanning method embodiment. As shown in FIG. 9, the vulnerability scanning system 90 includes a reverse scanning agent module 23 and a vulnerability scanner 21.

The vulnerability scanning system provided in the embodiment of the disclosure can perform the processing flow provided in the vulnerability scanning method embodiment.

In summary, the embodiment of the disclosure acquires the client message through reverse scanning agent module, and analyzes the client message to identify the vulnerability of the client, which supplements the basis of server security issue remote detection with client security issue analysis, thereby realizing security detection for the entire network environment. In addition, the embodiment of the disclosure classifies the vulnerabilities both in the server and the client according to different first classification rules in order to obtain the network defect type set; classifies the network regions, which includes the server and the client, according to different second classification rules in order to obtain the network sub-region set; obtains the network defect density according to the network defect type set and the network sub-region set; and obtains the network security level according to the network defect density, thereby realizing a quantitative description of the network security level. The embodiment of the disclosure specifically defines the association between the network security level and the network defect density, while additionally contributing a new way, which is accomplished via the network security level distribution, to determine the security of network.

In the several embodiments provided in the present disclosure, it should be understood that, the disclosed device and method may be implemented in other ways. For example, the device embodiments described above are merely illustrative, e.g. the units are categorized according to logical functions only, and other categories can be used in actual implementations. For instance, multiple units or components may be combined or integrated into another system, or some features can be omitted or skipped. Moreover, an illustrated or discussed coupling or direct coupling or communication connection may be an indirect coupling or communicative connection an interface, device or unit, and may be in electrical, mechanical, or other forms.

The units described as separate components may or may not be physically separated, and components shown in a single unit may or may not be in a physical unit, i.e., the components may be located in one place or may be distributed in a plurality of networked units. Some or all of the units may be selected according to the actual needs in realizing the objectives of the solutions of the embodiments.

In addition, various functional units in various embodiments of the present disclosure may be integrated into a single processing unit, or each unit may be presented in physically separated forms, or two or more units may be integrated into a single unit. The above-mentioned integrated unit can be implemented in the form of a hardware or in the form of a hardware plus software functional units.

The above described integrated unit, which is implemented in the form of software functional units, may be stored in a computer-readable storage medium. The software functional unit described above is stored in a storage medium, and includes instructions for causing a computer device (which may be a personal computer, a server, or a network device, etc.) or a processor to execute some steps of the methods described in various embodiments of the present disclosure. The storage medium described above includes a USB disk, a mobile hard disk, a read-only memory (ROM), a random access memory (RAM), a magnetic disk, an optical disk, and the like, each of which can store program code.

It will be apparent to those of ordinary skill in the art that, for the convenience and conciseness of the descriptions, various functional modules described above are divided by way of example only. In practical applications, various functions described above may be assigned to different functional modules. That is, the device may be internally structured into divisions of different functional modules in order to accomplish all or some of the functions described above. The particular operational process of the aforementioned device can be understood by referring to corresponding processes in the foregoing method embodiments, which will not be repeated herein.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A vulnerability scanning method, comprising:
   acquiring, by a reverse scanner agent installed on a server, a client message from a client;
   transmitting, by the reverse scanner agent, the client message to a vulnerability scanner, so that the vulnerability scanner identifies a vulnerability of the client according to the client message, or identifying, by the reverse scanner agent, a vulnerability of the client according to the client message and transmitting the vulnerability of the client to the vulnerability scanner; and
   receiving, by the reverse scanner agent, a control instruction from the vulnerability scanner, and changing a manner and/or a mode of operation according to the control instruction, and updating a vulnerability rule;
   wherein the method, further comprising:
   obtaining, by the reverse scanner agent or the vulnerability scanner, a vulnerability of the server; and
   obtaining, by the reverse scanner agent or the vulnerability scanner, network defect information according to the vulnerability of the server and the vulnerability of the client;
   wherein the network defect information comprises a network defect density and a network security level; and
   the obtaining network defect information according to the vulnerability of the server and the vulnerability of the client comprises:
   classifying the vulnerability of the server and the vulnerability of the client according to at least one first classification rule to obtain a network defect type set which comprises at least one type of network defect;
   classifying a network region, which includes the server and the client, according to at least one second classification rule to obtain a network sub-region set which comprises at least one network sub-region;
   obtaining the network defect density according to the network defect type set and the network sub-region set; and
   obtaining the network security level according to the network defect density.

2. The method according to claim 1, wherein the acquiring, by a reverse scanner agent, a client message from a client comprises:
   acquiring, by the reverse scanner agent, a service request message and a reply message transmitted from the client during an interaction between the client and the server; or
   transmitting, by the reverse scanner agent, a constructed test message to the client, and acquiring a respond message from the client in response to the constructed test message.

3. The method according to claim 2, wherein the identifying a vulnerability of the client according to the client message comprises:
   identifying the vulnerability of the client according to a characteristic field of the service request message, the reply message and/or the respond message; or
   identifying the vulnerability of the client by matching the service request message, the reply message and/or the respond message with a preset interaction message, a preset message sequence or a vulnerability characteristics rule.

4. The method according to claim 1, wherein the classifying the vulnerability of the server and the vulnerability of the client according to at least a first classification rule to obtain a network defect type set comprises:
   classifying, according to an m-th of the first classification rule, the vulnerability of the server and the vulnerability of the client into a first set $p_n^m = \{\delta_0^m, \delta_1^m \delta_2^m, \ldots, \delta_i^m, \ldots, \delta_{n-1}^m\}$, wherein $m \geq 1$, $n \geq 1$, the first set includes n types of network defects, $\delta_i^m$ represents an $(i+1)$-th type of network defect obtained by classifying the vulnerability of the server and the vulnerability of the client according to the m-th first classification rule, wherein, for $i,j \in [0, n-1]$ and $i \neq j$, $\delta_i^m$, $\delta_j^m \neq \emptyset$, $\delta_i^m \cap \delta_j^m = \emptyset$ and $\delta_0^m \cup \delta_1^m \cup \delta_2^m \cup \ldots \cup \delta_{n-1}^m = p_n^m$ are satisfied; and
   determining, in the first classification rule, a first target classification rule which classifies the vulnerability of the server and the vulnerability of the client into N or less than N types of network defects, and classifying the vulnerability of the server and the vulnerability of the client according to the first target classification rule in order to obtain a first set which constitutes the network defect type set $\delta_p = \cup_{n=1}^{N} \cup_{r=F(n)} \cup_{i=0}^{n-1} \delta_i^r$, wherein F(n) is a mapping function of n, and represents the first target classification rule for classifying the vulnerability of the server and the vulnerability of the client into n≤N types of network defects, and $\cup_{r=F(n)} \cup_{i=0}^{n-1} \delta_i^r$ represents the set of n≤N types of network defects obtained by classifying the vulnerability of the server and the vulnerability of the client.

5. The method according to claim 1, wherein the classifying a network region including the server and the client according to at least one second classification rule in order to obtain a network sub-region set comprises:

classifying, according to a t-th second classification rule in the at least one second classification rule, the network region into a second set $\rho^t = \{\rho_0^t, \rho_1^t, \rho_2^t, \ldots, \rho_s^t, \ldots, \rho_{S-1}^t\}$, wherein t≥1, S≥1, $\rho_s^t$ represents an (s+1)-th network sub-region obtained by classifying the network region according to the t-th second classification rule, wherein, for i,j∈[0, S−1] and i≠j, $\rho_i^t, \rho_j^t \neq \emptyset$, $\rho_i^t \cap \rho_j^t = \emptyset$ and $\rho_0^t \cup \rho_1^t \cup \rho_2^t \cup \ldots \cup \rho_{S-1}^t = \rho^t$ are satisfied; and classifying the network region according to T of the second classification rules separately, in order to obtain a second set which constitutes a network sub-region set $\rho = \cup_{t=1}^{T} \cup_{s=0}^{G(t)} \rho_s^t$, wherein G(t) represents the number of network sub-regions obtained by classifying the network region according to the t-th second classification rule.

6. The method according to claim 1, wherein the network defect density comprises a network defect density in the network sub-region and a device defect density in the network sub-region;

the obtaining the network defect density according to the network defect type set and the network sub-region set comprises: obtaining the network defect density $\tau_{t,s}^{m,i} = C(Q_{\rho_s^t}(\delta_i^m))$ in the network sub-region according to a network defect type set $\delta_p = \cup_{n=1}^{N} \cup_{r=F(n)} \cup_{i=0}^{n-1} \delta_i^r$ and a network sub-region set $\rho = \cup_{t=1}^{T} \cup_{s=0}^{G(t)} \rho_s^t$, wherein $\delta_i^m \in \delta_p = \cup_{n=1}^{N} \cup_{r=F(n)} \cup_{i=0}^{n-1} \delta_i^r$, $\rho_s^t \in \rho = \cup_{t=1}^{T} \cup_{s=0}^{G(t)} \rho_s^t$, $Q_{\rho_s^t}(\delta_i^m)$ is configured for selecting $\delta_i^m$ within the scope of $\rho_s^t$, and $C(Q_{\rho_s^t}(\delta_i^m))$ is configured for calculating the number of $Q_{\rho_s^t}(\delta_i^m)$; and obtaining the device defect density $\varphi_{m,i}^{t,s} = C(Q_{o_i^m}(\rho_s^t))$ in the network sub-region according to a network defect type set $\delta_p = \cup_{n=1}^{N} \cup_{r=F(n)} \cup_{i=0}^{n-1} \delta_i^r$ and a network sub-region set $\rho = \cup_{t=1}^{T} \cup_{s=0}^{G(t)} \rho_s^t$, wherein $\delta_i^m \in \delta_p = \cup_{n=1}^{N} \cup_{r=F(n)} \cup_{i=0}^{n-1} \delta_i^r$, $\rho_s^t \in \rho = \cup_{t=1}^{T} \cup_{s=0}^{G(t)} \rho_s^t$, $Q_{o_i^m}(\rho_s^t)$ is configured for selecting $\rho_s^t$ within the scope of $\delta_i^m$, and $C(Q_{o_i^m}(\rho_s^t))$ is configured for calculating the number of $Q_{o_i^m}(\rho_s^t)$, wherein $\delta_i^m$ represents an (i+1)-th type of network defect obtained by classifying the vulnerability of the server and the vulnerability of the client according to an m-th first classification rule; for i,j∈[0, n−1] and i≠j, $\delta_i^m, \delta_j^m \neq \emptyset$, $\delta_i^m \cap \delta_j^m = \emptyset$ and $\delta_0^m \cup \delta_1^m \cup \delta_2^m \cup \ldots \cup \delta_{n-1}^m = \delta_p$ are satisfied; $\rho_s^t$ represents an (s+1)-th network sub-region obtained by classifying a network region according to a t-th second classification rule; for i,j∈[0,S−1] and i≠j, $\rho_i^t, \rho_j^t \neq \emptyset$, $\rho_i^t \cap \rho_j^t = \emptyset$ and $\rho_0^t \cup \rho_1^t \cup \rho_2^t \cup \ldots \cup \rho_{S-1}^t = \rho$ are satisfied; F (n) is a mapping function of n, and represents a first target classification rule for classifying the vulnerability of the server and the vulnerability of the client into n≤N types of network defects; and G(t) represents the number of network sub-regions obtained by classifying the network region according to a t-th second classification rule.

7. The method according to claim 6, wherein the network security level comprises a first network security level and a second network security level; and the obtaining the network security level according to the network defect density comprises:

obtaining the first network security level $\gamma_{t,s} = \cup_{n=1}^{N} \cup_{m=F(n)} \cup_{i=0}^{n-1} \gamma_{t,s}^{m,i}$ according to the network defect density $\tau_{t,s}^{m,i} = C(Q_{\rho_s^t}(\delta_i^m))$ in the network sub-region, wherein $\gamma_{t,s}^{m,i} = Y_1(\tau_{t,s}^{m,i})$, and $Y_1$ is a monotonically decreasing function of $\tau_{t,s}^{m,i}$; and obtaining the second network security level $\gamma^{t,s} = \cup_{n=1}^{N} \cup_{m=F(n)} \cup_{i=0}^{n-1} \gamma_{m,i}^{t,s}$ according to the device defect density $\varphi_{m,i}^{t,s} = C(Q_{o_i^m}(\rho_s^t))$ in the network sub-region, wherein $\gamma_{m,i}^{t,s} = Y_2(\varphi_{m,i}^{t,s})$, and $Y_2$ is a monotonically decreasing function of $\varphi_{m,i}^{t,s}$.

8. The method according to claim 7, wherein the $\gamma_{t,d}^{m,i} = Y_1(\tau_{t,s}^{m,i})$ is $\gamma_{t,s}^{m,i} = \alpha_1 + \beta_1/\tau_{t,s}^{m,i}$; the $\gamma_{t,s}^{m,i} = Y_2(\varphi_{t,s}^{m,i})$ is $\gamma_{t,s}^{m,i} = \alpha_2 + \beta_2/\varphi_{t,s}^{m,i}$, wherein $\alpha_1, \beta_1, \alpha_2, \beta_2$ are constants.

9. The method according to claim 7, wherein the network defect information further comprises a network defect density distribution and a network security level distribution, the network defect density distribution comprises a distribution function of the network defect density in the network sub-region and a distribution function of the device defect density in the network sub-region, the network security level distribution comprises a distribution of the first network security level and a distribution of the second network security level, wherein the distribution function of the network defect density in the network sub-region is $\tau_t^{m,t} = \cup_{s \times 0}^{G(t)} \tau_{t,s}^{m,i}$, and the distribution function of the device defect density in the network sub-region is $\varphi_{m,t}^{t} = \cup_{s=0}^{G(t)} \varphi_{t,s}^{m,i}$; and the distribution of the first network security level is $y_t = \cup_{s=0}^{G(t)} \cup_{n=1}^{N} \cup_{m=F(n)} \cup_{i=0}^{n-1} \gamma_{t,s}^{m,i}$, and the distribution of the second network security level is $\gamma^t = \cup_{s=0}^{G(t)} \cup_{n=1}^{N} \cup_{m=F(n)} \cup_{i=0}^{n-1} \gamma_{t,s}^{m,i}$.

10. A non-transitory computer-readable storage medium comprising instructions stored thereon, when run on a computer device in a server, causing the computer device to: acquire a client message from a client; transmit the client message to a vulnerability scanner, so that the vulnerability scanner identifies a vulnerability of the client according to the client message, or identify a vulnerability of the client according to the client message and transmit the vulnerability of the client to the vulnerability scanner; and receive a control instruction from the vulnerability scanner, and change a manner and/or a mode of operation according to the control instruction, so as to update a vulnerability rule^ wherein the instructions stored thereon, when run on the computer device, further causing the computer device to: obtain the vulnerability of the server; and obtain network defect information according to the vulnerability of the server and the vulnerability of the client; wherein the network defect information comprises a network defect density and a network security level; and the instructions stored thereon, when run on the computer device, further causing the computer device to: classify the vulnerability of the server and the vulnerability of the client according to at least one first classification rule to obtain a network defect type set which comprises at least one type of network defect; classify a network region, which includes the server and the client, according to at least one second classification rule to obtain a network sub-region set which comprises at least one network sub-region; obtain the network defect density according to the network defect type set and the network sub-region set; and obtain the network security level according to the network defect density.

11. The non-transitory computer-readable storage medium according to claim 10, wherein the instructions stored thereon, when run on the computer device, further causing the computer device to: acquire a service request message and a reply message transmitted from the client during an interaction between the client and a server; or transmit a constructed test message to the client; and acquire a respond message from the client in response to the constructed test message.

12. The non-transitory computer-readable storage medium according to claim 11, wherein the instructions stored thereon, when run on the computer device, further causing the computer device to: identify the vulnerability of the client according to the characteristic field of the service request message, the reply message and/or the respond message; or identify the vulnerability of the client by matching the service request message, the reply message and/or the respond message with a preset interaction message, a preset message sequence or a vulnerability characteristics rule.

13. A non-transitory computer-readable storage medium comprising instructions stored thereon, when run on a computer device, causing the computer device to: receive a client message from a client transmitted from a reverse scanner agent installed on a server, or configured to receive a vulnerability of the client transmitted from the reverse scanner agent; identify the vulnerability of the client according to the client message; and transmit a control instruction to the reverse scanner agent, so that the reverse scanner agent changes a manner and/or a mode of operation according to the control instruction and update a vulnerability rule; wherein the instructions stored thereon, when run on the computer device, further causing the computer device to: obtain the vulnerability of the server; and obtain network defect information according to the vulnerability of the server and the vulnerability of the client; wherein the network defect information comprises a network defect density and a network security level; and the instructions stored thereon, when run on the computer device, further causing the computer device to: classify the vulnerability of the server and the vulnerability of the client according to at least one first classification rule to obtain a network defect type set which comprises at least one type of network defect; classify a network region, which includes the server and the client, according to at least one second classification rule to obtain a network sub-region set which comprises at least one network sub-region; obtain the network defect density according to the network defect type set and the network sub-region set; and obtain the network security level according to the network defect density.

14. The non-transitory computer-readable storage medium according to claim 13, wherein the instructions stored thereon, when run on the computer device, further causing the computer device to: identify the vulnerability of the client according to the characteristic field of the service request message, the reply message and/or the respond message; or to identify the vulnerability of the client by matching the service request message, the reply message and/or the respond message with a preset interaction message, a preset message sequence or a vulnerability characteristics rule.

* * * * *